(12) United States Patent
Huang

(10) Patent No.: US 6,788,290 B2
(45) Date of Patent: Sep. 7, 2004

(54) POINTING DEVICE BY SENSING GEOMAGNETIC FIELD

(75) Inventor: Shih-Sheng Huang, Taipei Hsien (TW)

(73) Assignee: Primax Electronics Ltd., Taipei (TW)

( * ) Notice: Subject to any disclaimer, the term of this patent is extended or adjusted under 35 U.S.C. 154(b) by 243 days.

(21) Appl. No.: 10/064,456

(22) Filed: Jul. 17, 2002

(65) Prior Publication Data

US 2003/0048253 A1 Mar. 13, 2003

(30) Foreign Application Priority Data

Sep. 12, 2001 (TW) ........................................ 90122668 A

(51) Int. Cl.$^7$ ................................................. G09G 5/08
(52) U.S. Cl. ..................................... 345/158; 345/163
(58) Field of Search ................................ 345/156, 157, 345/158, 163, 166; 710/1, 2

(56) References Cited

U.S. PATENT DOCUMENTS 5,504,502 A * 4/1996 Arita et al. .................. 345/160
6,509,888 B1 * 1/2003 Tuovinen et al. ........... 345/156

FOREIGN PATENT DOCUMENTS

JP 20022202850 * 7/2002

* cited by examiner

Primary Examiner—Vijay Shankar
Assistant Examiner—Nitin Patel
(74) Attorney, Agent, or Firm—Winston Hsu

(57) ABSTRACT

A pointing device of a computer includes a sensing module and a button. The sensing module has two magnetism detectors, each detector having a unique sensing axis. The magnetism detectors generate signals according to the relative changes of the sensing axes with respect to the geomagnetic field. The sensing signals and button signal are processed and transmitted to the computer for use in controlling the function of the computer.

4 Claims, 6 Drawing Sheets

POINTING DEVICE BY SENSING GEOMAGNETIC FIELD

BACKGROUND OF INVENTION

1. Field of the Invention

The present invention relates to a pointing device of a computer. More specifically, the present invention discloses a pointing device for generating a displacement signal according to the displacement of the pointing device with respect to a geomagnetic field.

2. Description of the Prior Art

In modern computer systems, a graphical user interface (GUI) has become the main method of interaction for a computer, user. GUIs are typically user-friendly and have simple and intuitive designs. In cooperation with the GUI, a pointing device has become a necessary peripheral device of the modern computer system by allowing the user to both operate the movement of the on-screen cursor and execute commands. It is therefore an important research objective of the information industry to develop an ergonomic and user-friendly pointing device.

The typical and commonly used pointing device is a mouse. The prior art mouse comprises a rolling ball mechanism disposed at the bottom of the mouse. When the user moves the mouse across a plane, the roller ball is caused to roll. The displacement of the mouse is measured by sensing the rolling action of the roller ball. This displacement measurement is translated into a displacement of the cursor on the computer screen. In other words, the cursor on the computer screen makes a corresponding movement when the user moves the mouse. As a result, the user may operate the GUI of the computer system with the mouse.

The drawback of the prior art mouse is that the mechanical mechanism of the roller ball is vulnerable to particles (such as dust), which results in wear of the mechanical mechanism. Because of this, periodic cleaning and maintenance are necessary. In addition, the user must operate the prior art mouse directly on a flat surface so that the roller ball contacts the flat surface. Consequently, the user can feel tired and strained due to these repetitive plane-limited movements. Furthermore, there is the possibility of serious injury with continued use.

SUMMARY OF INVENTION

It is therefore a primary objective of the claimed invention to provide a pointing device to sense displacement with respect to the geomagnetic field to solve the above-mentioned problems.

According to the claimed invention, the pointing device comprises a housing, at least a button installed on the housing for generating a control signal when a user presses the button, and a sensing module installed inside the housing. The sensing module further comprises a first magnetism detector comprising a first sensing axis, a second magnetism detector comprising a second sensing axis, an amplifier and a decoder. The first magnetism detector generates a first sensing signal according to a relative change of the first sensing axis with respect to a geomagnetic field. The second magnetism detector generates a second sensing signal according to a relative change of the second sensing axis with respect to the geomagnetic field. The amplifier is connected to the first magnetism detector and the second magnetism detector for amplifying the first sensing signal and the second sensing signal. The decoder is connected to the amplifier for generating a two-dimensional displacement signal according to the amplified first sensing signal and the amplified second sensing signal. The first sensing axis is not parallel with the second sensing axis and forms a predetermined angle with the second sensing axis. The first magnetism detector and the second magnetism detector respectively sense changes of the first sensing axis and the second sensing axis with respect to the geomagnetic field when the user moves the pointing device such that the decoder generates the corresponding two-dimensional displacement signal accordingly.

It is an advantage of the claimed invention that the pointing device utilizes an entirely electronic means to measure the displacement of the pointing device. Furthermore, the pointing device references the geomagnetic field. Therefore, the user feels less tired or strained after extended use of the pointing device.

These and other objectives and advantages of the present invention will no doubt become obvious to those of ordinary skill in the art after reading the following detailed description of the preferred embodiment that is illustrated in the various figures and drawings.

DETAILED DESCRIPTION

Figure 1:
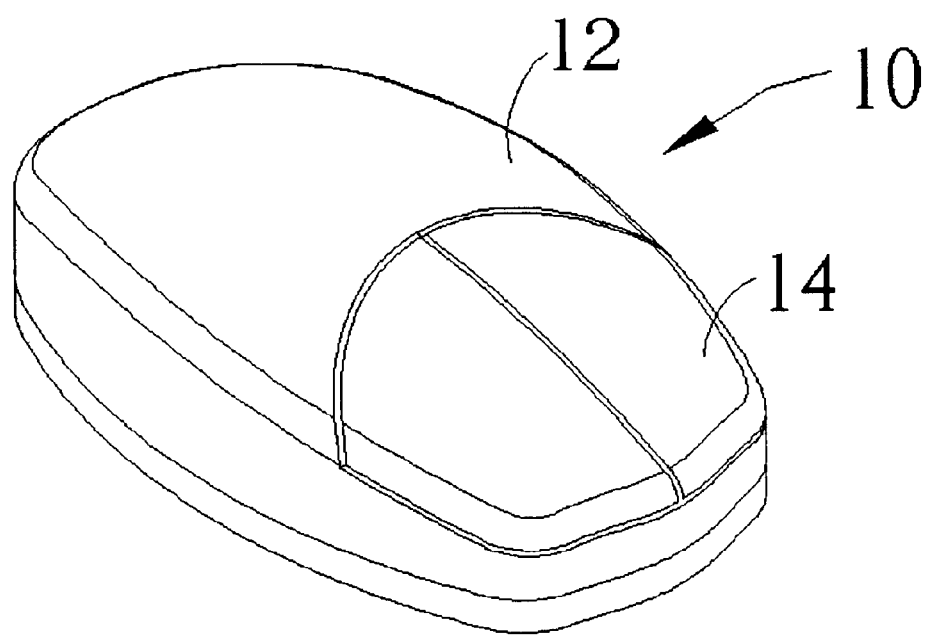
FIG. 1 is a perspective view of a mouse for utilizing as a pointing device according to the present invention.

Please refer to FIG. 1. FIG. 1 is a perspective view a mouse 10 for utilizing as a pointing device according to the present invention. The mouse 10 is encased in a housing 12. Buttons 14 are installed on the housing. When a user presses the button 14, the button 14 will generate a corresponding control signal.

Figure 2:
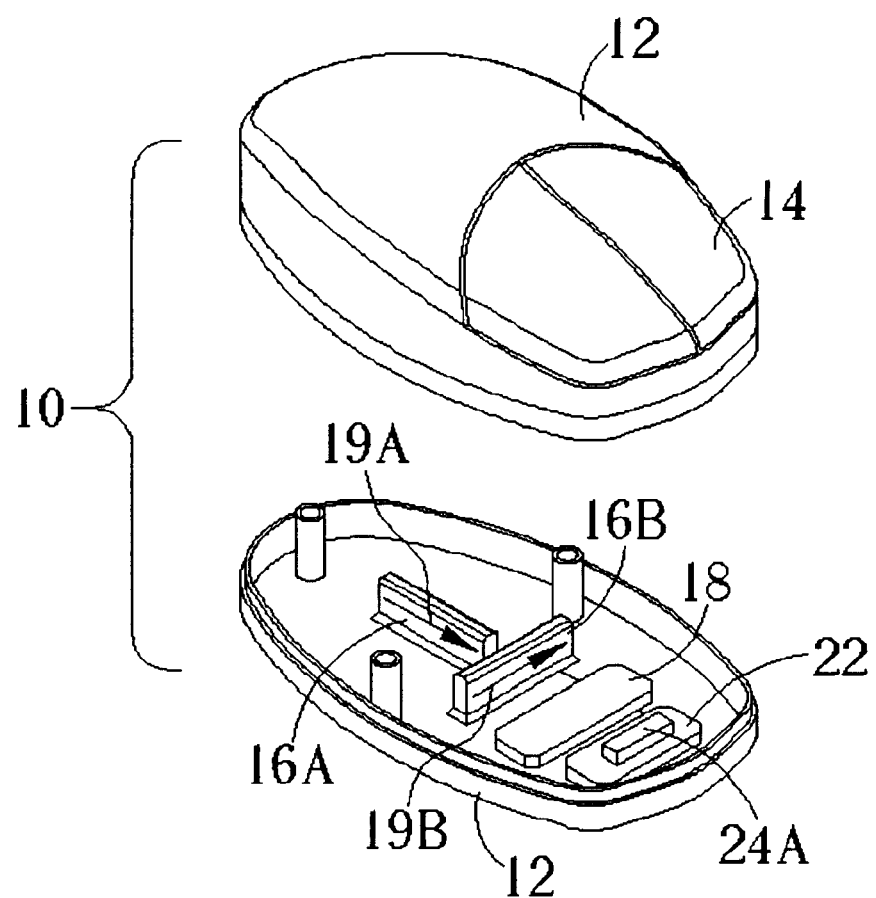
FIG. 2 is a schematic diagram of an internal structure of the mouse in FIG. 1.
Figure 3:
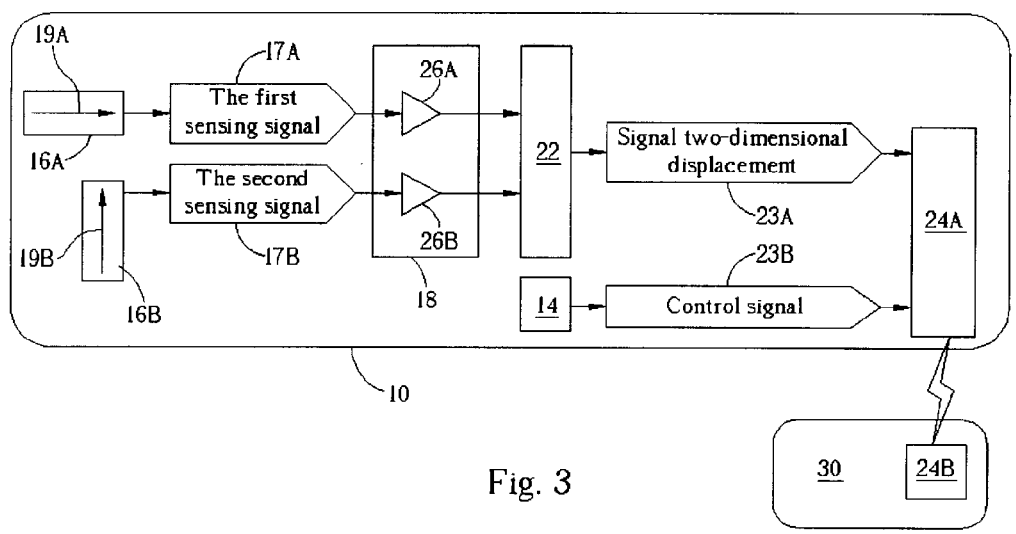
FIG. 3 is a functional block diagram of the mouse depicted in FIG. 2.

Please refer to FIG. 2 and FIG. 3. FIG. 2 is a schematic diagram of an internal structure of a mouse 10 according to the present invention. FIG. 3 is a functional block diagram of the mouse 10 depicted in FIG. 2. As shown in FIG. 2, a first magnetism detector 16A, a second magnetism detector 16B, an amplifier 18, a decoder 22 and a first wireless transmission module 24A are installed inside the housing. An arrow 19A represents the direction of a first sensing axis of the first magnetism detector 16A. An arrow 19B represents the direction of a second sensing axis of the second magnetism detector 16B. As shown in FIG. 2 and FIG. 3, the direction of the arrow 19A is perpendicular to the direction of the arrow 19B. The first magnetism detector 16A and the second magnetism detector 16B operate under the same principle. The first magnetism detector 16A senses the change of the first sensing axis with respect to the geomagnetic field and generates a corresponding first sensing signal 17A. Similarly, the second magnetism detector 16B senses the change of the second sensing axis with respect to the geomagnetic field and generates a corresponding second sensing signal 17B. The first sensing signal 17A and the second sensing signal 17B are first amplified by the amplifying circuits 26A and 26B (shown in FIG. 3) in the amplifier 18 respectively, and are then sent to the decoder 22. Since the sensing axis of the first magnetism detector 16A is perpendicular to the sensing axis of the second magnetism detector 16B, the relative displacement with respect to the geomagnetic field, resulting from moving the mouse 10, is divided into two perpendicular components. These two components are contained in the first sensing signal 17A and the second sensing signal 17B respectively. The decoder 22 then analyzes the amplified first sensing signal 17A and the amplified second sensing signal 17B to determine the two perpendicular displacement components, which reflect the actual displacement of the mouse 10, and generates a two-dimensional displacement signal 23A. In the preferred embodiment of the present invention, a first wireless transmission module 24A is installed inside the mouse 10 for transmitting the two-dimensional displacement signal 23A through radio communication. In addition, a control signal 23B generated by a user by pressing the button 14 is transmitted from the first wireless transmission module 24A through radio communication. As the mouse 10 is a pointing device of a computer system 30, the control signal 23B and the two-dimensional displacement signal 23A transmitted from the first wireless transmission module 24A through radio communication are received by a second wireless transmission module 24B located in the computer system 30.

The operating procedure of the present invention mouse 10 is described as follows. When the user moves the mouse 10, the first and second magnetism detectors 16A and 16B fixed inside the mouse 10 and their corresponding first and second sensing axis move as well. The first sensing axis and the second sensing axis respectively form different angles with reference to the geomagnetic field of fixed orientation as the user moves the mouse 10. The first and the second magnetism detectors 16A and 16B sense such changes and respectively generate the corresponding first and second sensing signals 17A and 17B. Since the first sensing axis is perpendicular to the second sensing axis, the corresponding first and second sensing signals, 17A and 17B, are equivalent to the two perpendicular components obtained by decomposing the displacement vector of the mouse 10. After the corresponding first and second sensing signal 17A and 17B are processed by the amplifier 18 and the decoder 22, a two-dimensional displacement signal 23A is thus generated to represent the two-dimensional displacement of the mouse 10. In addition, the user can press the button 14 to generate a corresponding control signal 23B. The two-dimensional displacement signal 23A and the control signal 23B are transmitted to the second wireless transmission module 24B in the computer system 30 from the first wireless transmission module 24A inside the mouse 10 through radio communication. The computer system 30 receives the two-dimensional displacement signal and the control signal that are then used to move the cursor and execute functions correspondingly such that the user can operate the computer system 30 by utilizing the mouse 10.

Figure 4A:
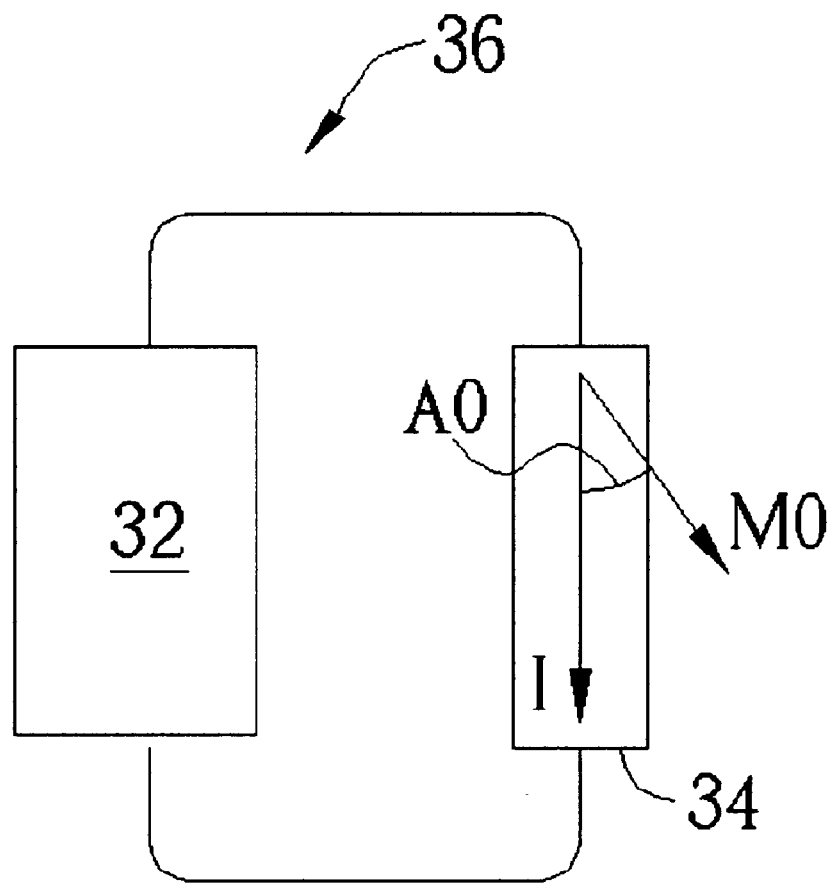
FIG. 4A and FIG. 4B are diagrams to show the operating method of a magnetoresistor detector under different magnetic fields.
Figure 4B:
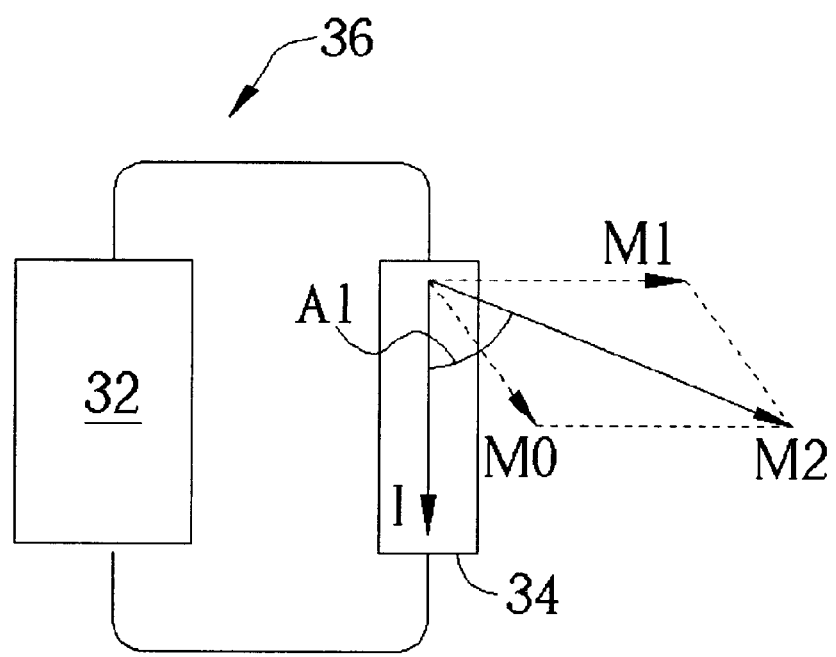

The first and second magnetism detectors 16A and 16B in the present invention may be realized by using magnetoresistor detectors. The working principle of a magnetoresistor detector 36 under the influence of different magnetic fields is illustrated in FIGS. 4A, 4B. The magnetoresistor detector 36 is realized by a magnetoresistor 34 and a resistor measurement circuit 32. The magnetoresistor 34 behaves like a typical electrical resistor except that the resistance of the magnetoresistor changes as the external magnetic field changes. Furthermore, the resistance of the magnetoresistor 34 depends on the angle between the magnetic field and the direction of a current I passing through the magnetoresistor. The resistor measurement circuit 32 is utilized to measure the resistance of the magnetoresistor 34. As shown in FIG. 4A, the magnetoresistor 34 has its own induced magnetic field Mo. When there is no external magnetic field, the angle between the current I and the magnetic field M0 is A0. As shown in FIG. 4B, when there is an external magnetic field M1 applied on the magnetism detector 36, the external magnetic field M1 would add to magnetic field M0 and create a magnetic field M2. The angle between the magnetic field M2 and the current I becomes A1 and the resistance of the magnetoresistor 34 changes as angle A1 is changed. The resistor measurement circuit 32 measures the resistance change of the magnetoresistor 34 and generates a corresponding sensing signal that reflects the change of the external magnetic field. As known by those skilled in the arts and illustrated in FIG. 4B, when the direction of the external magnetic field M1 changes the angle A1 between the current I and the total magnetic field M2 changes causing the resistance of the magnetoresistor 34 to change. In practical application, the direction of the current I or the direction of the induced magnetic field M0 of the magnetoresistor 34 could be regarded as the sensing axis of the magnetoresistor detector.

Figure 5:
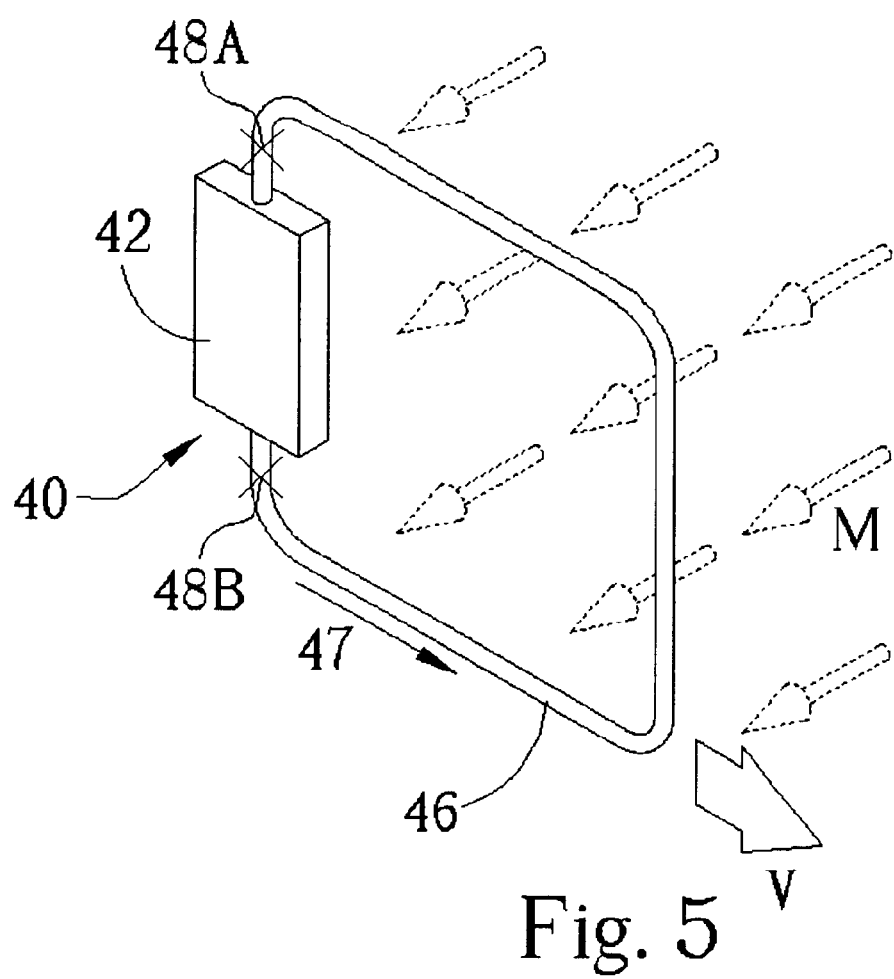
FIG. 5 is a schematic diagram to show the principle of utilizing an electromagnetic inductance detector as a magnetism detector.

In addition, the present invention magnetism detector can be created by employing the principle of electromagnetic inductance. Please refer to FIG. 5, which is a schematic diagram showing the principle of utilizing an electromagnetic inductance detector 40 as a magnetism detector. The electromagnetic inductance detector 40 is formed by a conductive ring 46 and a potential measurement circuit 42. As known from Faraday's law, when the conductive ring 46 moves across the a static magnetic field M, such as the geomagnetic field, with a velocity V, a potential difference (the so-called flux-cutting electromotive force) is produced between a node 48A and a node 48B in the conductive ring 46 due to the electromagnetic inductance effect. This potential difference, as measured by the potential measurement circuit 42, is proportional to velocity V. In practical application, the electromagnetic inductance detector 40 is fixed in the mouse. The conductive ring 46 moves across the geomagnetic field, as the mouse is moved, and produces the potential difference. The potential measurement circuit 42 can cooperate with a high frequency clock pulse to periodically measure the potential difference. Since the period of the clock pulse is fixed, the displacement of the mouse can be obtained by comparing the potential differences measured. The direction 47 of the conductive ring 46 can be regarded as the sensing axis of the electromagnetic inductance detector 40.

In contrast to the prior art, the present invention mouse utilizes an entirely electronic means to measure the displacement of the mouse. Since the present invention mouse has no mechanical parts, as the prior art rolling ball type mouse, the problem of mechanical wear is eliminated. Furthermore, the present invention mouse need not be operated on a flat planar surface as it references the geomagnetic field. This results in the user feeling less tired or strained after extended use of the mouse, and the possibility of long-term serious injury can be avoided.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A pointing device of a computer comprising:

a housing;

at least a button installed on the housing for generating a control signal when a user presses the button; and a sensing module installed inside the housing comprising:

a first magnetism detector comprising a first sensing axis, the first magnetism detector generating a first sensing signal according to a relative change of the first sensing axis with respect to a geomagnetic field;

a second magnetism detector comprising a second sensing axis, the second magnetism detector generating a second sensing signal according to a relative change of the second sensing axis with respect to the geomagnetic field;

an amplifier connected to the first magnetism detector and the second magnetism detector for amplifying the first sensing signal and the second sensing signal; and a decoder connected to the amplifier for generating a two-dimensional displacement signal according to the amplified first sensing signal and the amplified second sensing signal;

wherein the first sensing axis is not parallel with the second sensing axis and forms a predetermined angle with the second sensing axis, and the first magnetism detector and the second magnetism detector respectively sense changes of the first sensing axis and the second sensing axis with respect to the geomagnetic field when the user moves the pointing device such that the decoder generates the corresponding two-dimensional displacement signal according to the changes of the first sensing axis and the second sensing axis with respect to the geomagnetic field.

2. The pointing device of claim 1 further comprising a first wireless transmission module for transmitting the control signal and the two-dimensional displacement signal through radio communication.

3. The pointing device of claim 2 wherein the computer further comprises a second wireless transmission module for receiving the control signal and the two-dimensional displacement signal.

4. The pointing device of claim 1 wherein each of the first magnetism detector and the second magnetism detector comprises a magnetoresistor.

* * * * *